R. W. DULL.
APPARATUS FOR SCREENING AND WASHING GRAVEL.
APPLICATION FILED OCT. 21, 1915.

1,342,990.

Patented June 8, 1920.

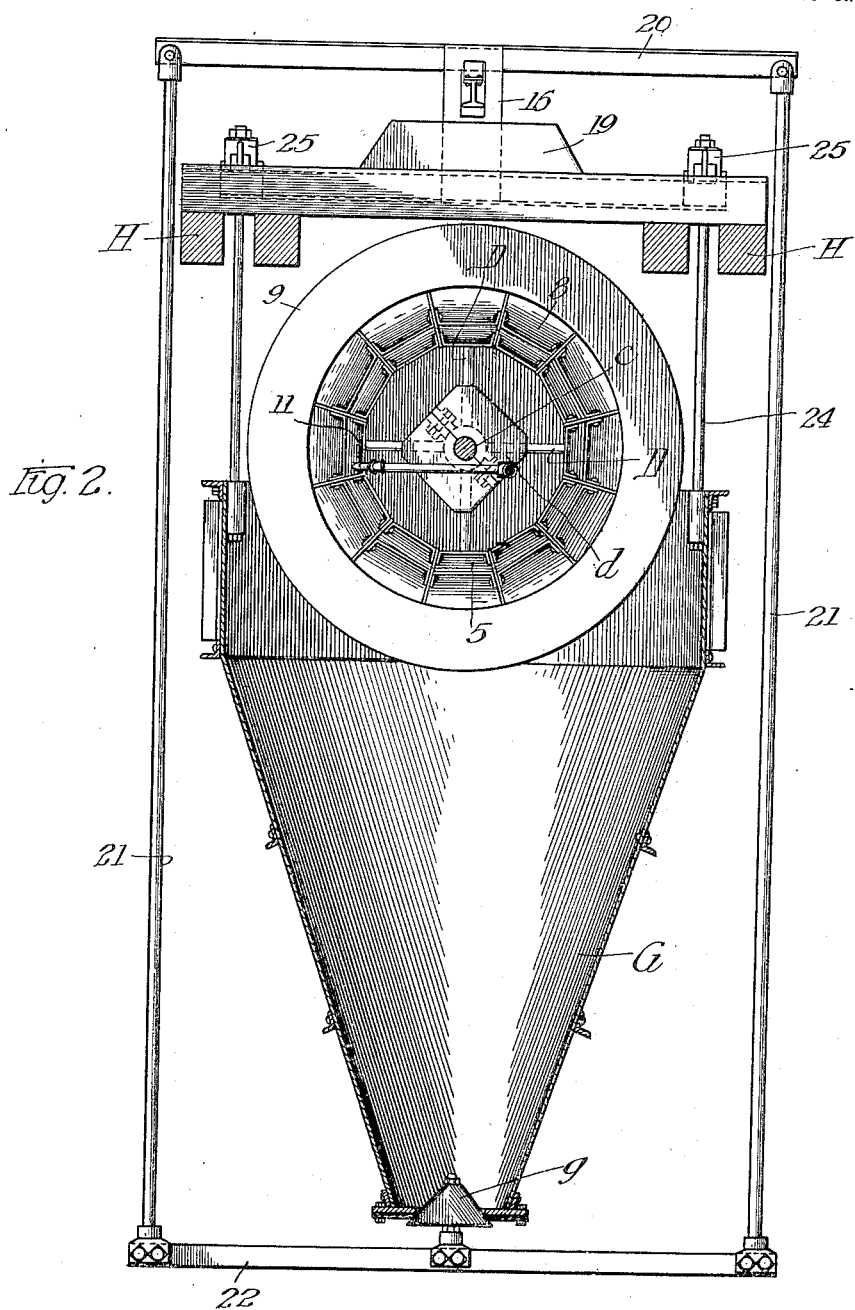

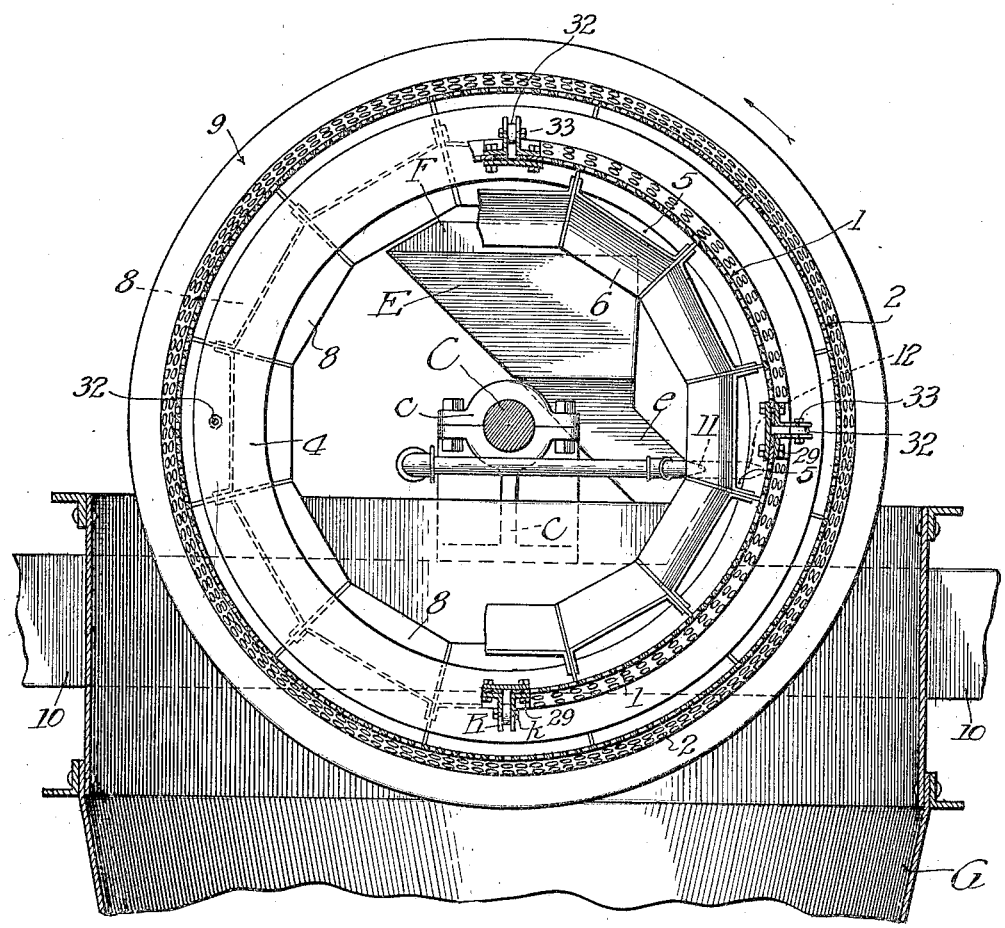
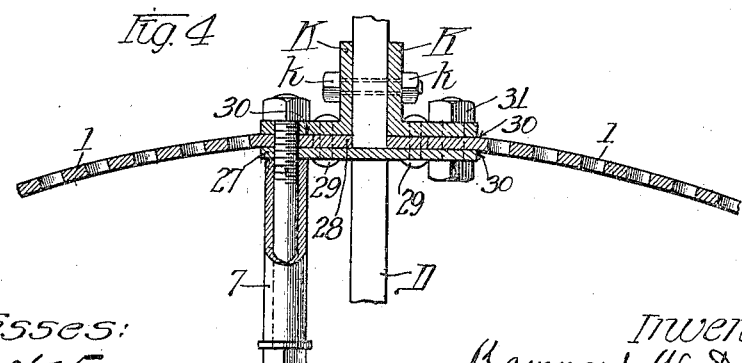

R. W. DULL.
APPARATUS FOR SCREENING AND WASHING GRAVEL.
APPLICATION FILED OCT. 21, 1915.
1,342,990.
Patented June 8, 1920.
4 SHEETS—SHEET 4.
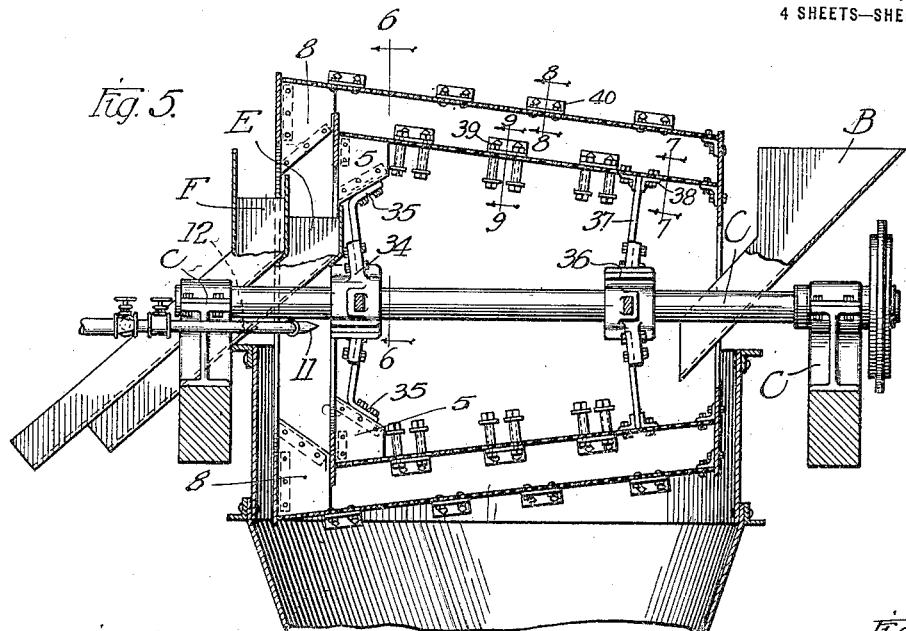
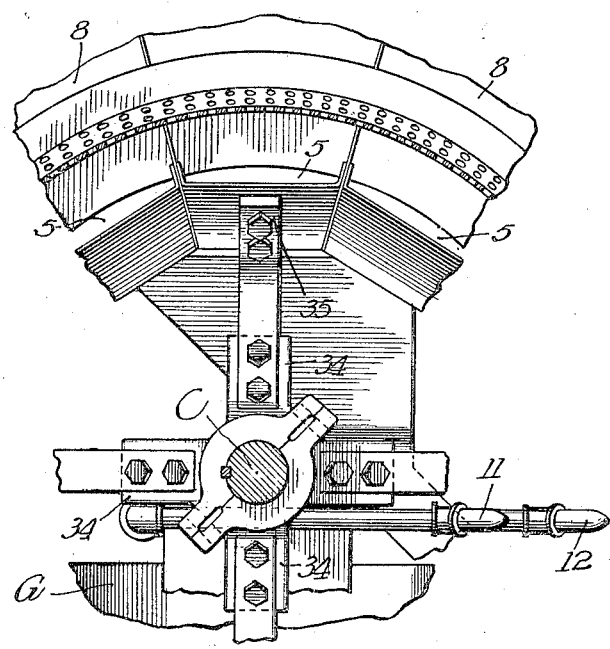
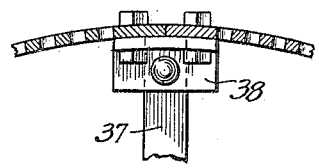
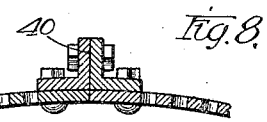
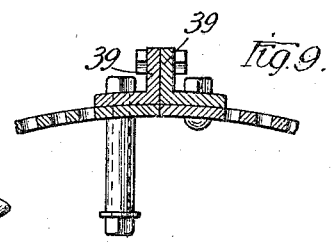

UNITED STATES PATENT OFFICE.

RAYMOND W. DULL, OF LA GRANGE, ILLINOIS.

APPARATUS FOR SCREENING AND WASHING GRAVEL.

1,342,990.      Specification of Letters Patent.    Patented June 8, 1920.

Application filed October 21, 1915. Serial No. 57,119.

*To all whom it may concern:*

Be it known that I, RAYMOND W. DULL, a citizen of the United States of America, and resident of La Grange, Illinois, have invented a certain new and useful Improvement in Apparatus for Screening and Washing Gravel, of which the following is a specification.

My invention relates to an apparatus for washing and grading gravel and separating the sand and water therefrom.

Generally stated, the object of my invention is to provide a novel and highly efficient gravel washing apparatus of this general character.

A special object is to provide an improved construction and arrangement whereby the sand and water are discharged directly from the lower side of a rotary screen into a receptacle, the said screen being arranged to rotate with its under side submerged in the water which collects in the said receptacle, and which thereafter overflows from the top of said receptacle, a valve being provided at the bottom of said receptacle for discharging sand, and mechanism being provided for permitting the said receptacle to move downward when sufficient sand and water have accumulated therein, thereby to automatically open said valve and thus periodically discharge the sand from the bottom of said receptacle, which latter serves also as a washing tank for the rotary screen.

Another object is to provide an improved construction and arrangement which serves to reduce the length of the screen, but at the same time producing the desired separation of the sand from the gravel, and of the relatively fine gravel from the coarse gravel, thereby to produce the desired general result of screening and washing the gravel, as well as grading the same into different sizes, with an apparatus in which the screen is comparatively short.

It is also an object to provide certain details and features of construction and novel combinations tending to increase the general efficiency and desirability of a gravel screening and washing apparatus of this particular character.

To the foregoing and other useful ends my invention consists in matters hereinafter set forth and claimed.

In the accompanying drawings,

Fig. 2, is a vertical section on line 2—2 in Fig. 1.

Fig. 3, is an enlarged detail section on line 3—3 in Fig. 1.

Fig. 4, is an enlarged detail fragmentary section on line 4—4 in Fig. 1.

Fig. 5, is a longitudinal section of the upper portion of a screening apparatus embodying the principles of my invention, showing another construction thereof.

Fig. 6, is an enlarged detailed section on line 6—6 in Fig. 5.

Fig. 7, is an enlarged detailed section on line 7—7 in Fig. 5.

Fig. 8, is an enlarged detailed section on line 8—8 in Fig. 5.

Fig. 9, is a similar section on line 9—9 in Fig. 5.

Figure 1:
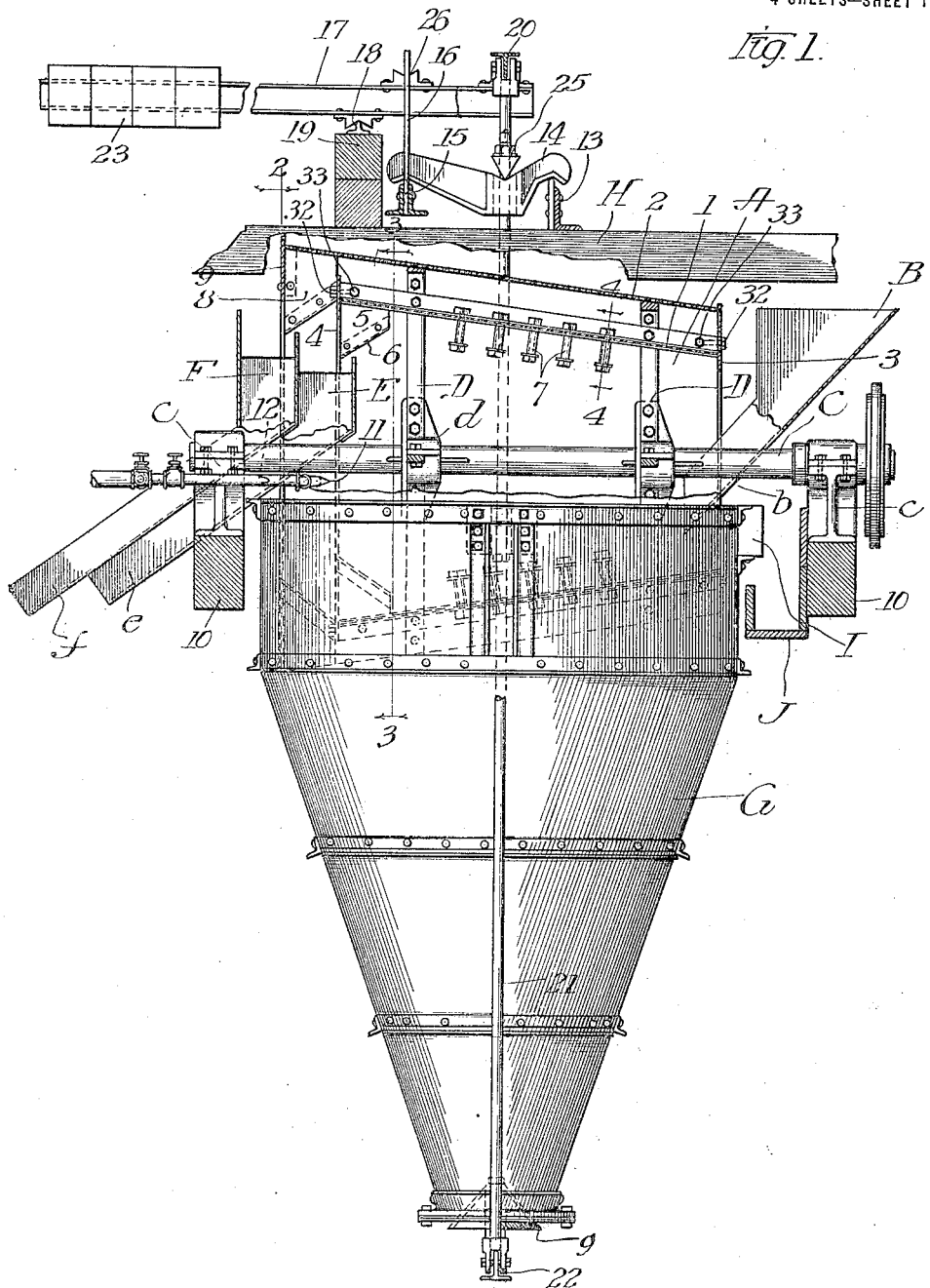
Figure 1, is a side elevation of a gravel washing and screening apparatus embodying the principles of my invention, showing the upper portion of the rotary screen in vertical and longitudinal section.

As thus illustrated, my invention comprises a rotary screen A composed of concentrically arranged inner and outer tapered screen members (1) and (2), there being space between the outer surface of the inner member (1) and the inner surface of the outer member (2), and the smaller ends of these members being closed by a flat plate (3) having an opening in the center thereof for the feeding hopper B and the horizontally disposed rotary shaft D, the two screen members being rigidly connected together and firmly mounted on said shaft through the medium of spiders D and D, which are split or divided and provided with clamping bolts *d* by which they are adjustably and removably secured upon said shaft. The inner member (1) is somewhat shorter than the outer member (2) and has its larger end partially closed by a flat plate (4), having a central opening for the said shaft and the receiving or discharge hopper E, which has a spout *e* for discharging the relatively coarse gravel from the inner screen member; it being understood that the perforations of the screen member (1) are larger than the perforations with which the walls of the screen member (2) are provided. Immediately inside of the plate (4) are the pockets (5), which are larger at their outer ends than at the inner ends thereof, the said smaller inner ends being open to receive the gravel which accumulates in the inner member (1), and this relatively coarse gravel being discharged whenever a pocket reaches a position over the hopper E, it being observed that the inclination of the sloping wall (6) of each pocket serves automatically to discharge the load into the hopper. In other words, the flat plate or annular wall (4) serves to retain the gravel in the pockets (5) until the point of discharge is reached over the hopper E, and then the sloping walls (6) of said pockets cause the gravel to slide down and enter the said hopper. This screen member (1) is provided internally with studs or projections (7), which serve to break up the gravel and sand and counteract the tendency of the same to agglomerate or form in masses, which would interfere with the proper action of the screen. The sand and finer gravel pass through the perforations of the member (1) and onto the perforated wall of the outer member (2), and the gravel in this outer member gradually works downward toward the larger end of the screen until it finally enters the pockets (8), which are similar to the pockets (6), being open at their smaller and inner ends and partially closed at their larger or outer ends by the flat annular plate (9) suitably secured to the end of the screen. The pockets (8) successively discharge their loads of the finer grade of gravel into the hopper F, which is disposed immediately outside of the hopper E, whereby the gravel is divided into relatively coarse and fine quantities. The hopper F has a spout $f$ for the discharge of the finer gravel. The shaft C can be rotated by any suitable means, being supported on bearings $c$ carried on beams (10); and, during rotation of the screen, water is injected into the pockets (5) and (8) by nozzles (11) and (12) suitably connected and arranged for this purpose, whereby the gravel discharging from these pockets is washed and thoroughly rinsed and made clean before being received by the two hoppers.

The quantities of sand and water which pass through the perforations of the outer member (2), fall directly into the receptacle G, which is arranged to receive the screen to an extent equal to about one-half the diameter of the latter, or a little less, it being observed that the shaft C extends horizontally across the top of said receptacle. This receptacle tapers downward and has its lower end provided with a valved opening having a movable valve member $g$, which opens downward and away from said opening to discharge the sand which accumulates, of course, in the bottom of the receptacle. Parallel beams H are arranged above the screen, at right-angles to the beams (10), and are provided with fulcrums (13) for the levers (14), which latter have their outer ends arranged to rest on the fulcrum bar (15) carried by the link (16), which is disposed centrally of said bar. The counterbalance arm (17) is provided with a fulcrum (18) on the beams (19), which extend crosswise of the beams H, and the crossbar (20) is mounted on the end of this arm (17) and provided at its ends with depending rods (21), which connect at their lower ends with the outer ends of a horizontal bar (22), upon which the valve member $g$ is mounted. It will be observed that these rods (21) are disposed at opposite sides of the said screen and receptacle, and the arrangement is such that the valve member $g$ moves downward faster than the receptacle when the counterbalance (23) is raised by a full load in the receptacle. Hanger rods (24) are attached at their lower ends to the sides of the receptacle and provided at their upper ends with wedge shaped pieces (25), which bear upon the parallel levers (14) at points nearer the fulcrum (13) than the bar (15), whereby receptacle G moves up and down in the desired manner. It will be understood that the rods (24) extend upward through suitably formed openings in the levers (14), whereby the wedge shaped pieces (25) are properly engaged with the tops of said levers. The link (16) is, it will be seen, engaged with the counterbalance arm (17) at (26), whereby this link is nearer the fulcrum (18) than the crossbar (20), thereby insuring a faster downward movement of the rods (21) than of the link (16) when the counterbalance (23) is raised by the load in the receptacle. Thus, as stated, the receptacle G receives the sand and water directly from the lower side of the screen, and when a sufficient load is accumulated, the receptacle moves downward and the sand is discharged by the opening of the valve at the bottom. The water which accumulates at the top of the receptacle, and in which the bottom of the screen is submerged, overflows through the spout I into the trough J and is carried away in a suitable manner. It will be observed that this spout I is located at the receiving end of the screen. Water may also be supplied through the hopper B and its spout $b$ with the sand and gravel, depending upon conditions, and in any event the method of washing is such that water finds its way into receptacle G with the sand. Thus, the receptacle G of the automatic sand separator, or apparatus for separating the water from the sand, serves also as a washing tank for the screen. This insures a very thorough cleansing of the gravel and separation thereof from all mud and sand before the two sizes of gravel are allowed to discharge separately from the larger end of the screen into the two separate hoppers provided for this purpose, as previously described.

It is understood that the studs or projections (7) can be provided in any suitable manner. Fig. 4 illustrates one method of mounting and arranging these studs, it being understood in this connection that both the inner and outer screen members (1) and (2) are divided longitudinally into sections, as shown in this figure, whereby the entire screen can be removed without disturbing the rotary shaft. The angle irons K are secured together by bolts *k*, which bolts also extend through the arms of the spiders D, the latter extending between said angle irons. Each angle iron K has secured thereto an inner strip (27), inside of the screen (1), the said angle iron and strip being spaced apart by a filler plate (28), and the three layers being rigidly connected by rivets (29) or other suitable means. In this way, grooves (30) are provided in which the longitudinal edge portions of the sections of the screen (1) are inserted and clamped in place by bolts (31) which extend through the three layers of metal. The bolts of one of the angle irons K are extended inward some distance and are each provided with a long washer or sleeve, as shown, bearing against the strip 27, to form studs (7), which latter extend in a row along the inner surface of the screen. It is understood that the screen may have any desired number of these rows of studs or long bolts, four oppositely arranged rows being shown in the drawings, one row for each longitudinal joint in the screen. With this construction, by removing the bolts (31), any one of the four sections of the screen (1) can be drawn outward toward the larger end of the screen without disturbing the others, as the grooves (30) form guideways in which the edge portions of the screen sections are free to slide longitudinally therein. Furthermore, the plates (3) and (4) are held in position by eye bolts (32) which extend between the angle irons K, see Fig. 1, and the eyes of which engage the bolts (33) extending through the said angle irons; the nuts for the bolts (32) are disposed outside and bear against the plates (3) and (4), whereby the latter may be easily removed.

As shown, the screening apparatus comprises two screens, one within the other, but it is to be understood that any suitable or desired number of screens can be employed, depending upon how it is desired to grade the gravel, and how many sizes thereof are desired. Also, the screen thus constructed rotates in the water which thereafter overflows the top of the separator receptacle, and in this way is agitated to keep the mud and lighter particles in suspension, preventing the same from settling, and thereby insuring a clearer sand for the discharge at the lower end of the receptacle.

As shown in Figs. 5 to 9 inclusive, the construction is as follows: The spider 34 is similar to the one previously described except that in this case the outer ends thereof are bent over and secured to the inner walls of the pockets 5 (previously described) whereby the two screens are supported at this end through the medium of the inner ring of pockets. At the other end, the spider 36 is provided with arms 37 which are secured to the inner surface of the inner screens by clips or angle pieces 38, as shown in Fig. 7. The inner screen is split or divided longitudinally, as previously described, but in this case the sections are held together along their longitudinal meeting edges by clips or angle pieces 39 as shown in Fig. 9. Also, the outer screen is similarly constructed and the sections thereof are held together by the clips 40 disposed at intervals along the meeting edges of the sections. In this case, therefore, the spider arms do not extend through the inner screen to the outer screen, but on the contrary are entirely inclosed by the inner screen. Otherwise, the construction is substantially the same as that previously described.

What I claim as my invention is:—

1. A combined screening and washing and separating apparatus, comprising a rotary screen, means for feeding sand and gravel to said screen, means for receiving the gravel from the screen, means for supplying water to the screen to wash the gravel, a receptacle to receive the water and sand from said screen, the construction and arrangement being such that the screen rotates in the water which thereafter overflows from the top of said receptacle, mechanism to permit downward movement of said receptacle when a sufficient load is accumulated therein, stationary means to support said screen independently of said receptacle, so that said screen is not sustained by said receptacle, and a valve having a connection operated by said mechanism during the downward movement of said receptacle to discharge the sand from the bottom thereof.

2. A combined screening and washing and separating apparatus as specified in claim 1, said screen being mounted to rotate about a fixed horizontal axis extending below said mechanism.

3. A combined screening and washing and separating apparatus, as specified in claim 1, said valve connection including a pair of rods disposed vertically at opposite sides of said receptacle and screen.

4. A combined screening and washing and separating apparatus, as specified in claim 1, said mechanism being disposed above said screen.

5. A combined screening and washing and separating apparatus, as specified in claim 1, said screen extending a distance downward between the sides of said receptacle, and said screen having means for lifting the gravel above the top of said receptacle before delivering the same to said receiving means.

6. A combined screening and washing and separating apparatus, as specified in claim 1, said receptacle having a spout which moves up and down with said receptacle adjacent the receiving end of said screen to discharge the water.

7. A combined screening and washing and separating apparatus, as specified in claim 1, said receptacle having a pair of hanger rods at opposite sides thereof, forming a space between them for said screen, and said screen having a horizontal shaft disposed across the top of said receptacle and substantially midway between said rods.

8. A rotating screen having studs provided with sleeves projecting inward from the walls thereof, with space between said studs, said screen being composed of sections, means coöperating with said sleeves to hold the sections together, and means to rotate said screen.

9. A screening apparatus comprising a rotary screen body divided longitudinally into sections, a shaft extending through said body, a spider on said shaft, angle irons extending from one end of the body to the other on the top side thereof, means whereby certain flanges of said angle irons are removably secured to the arms of said spider, means in conjunction with the other flanges of said angle irons to provide grooves for receiving the longitudinal edges of the sections, and means to secure the sections in said grooves and to said spider, and whereby each section is removable endwise without disturbing any other section.

10. A sand separator comprising a receptacle, means to supply the sand and water at the top of said receptacle, the water overflowing the top of the receptacle, means whereby said receptacle is movable by gravity when loaded, means controlled by movement of the receptacle for discharging the sand from the bottom of the receptacle, a mechanical agitator arranged to operate in the water at the top of the receptacle, and means to support said agitator independently of said receptacle.

11. A sand separator as specified in claim 10, said agitator having means for receiving the said sand and water and discharge the same into said receptacle.

12. A sand separator as specified in claim 11, said agitator having means for receiving the said sand and water and discharging the same into said receptacle, and said agitator being also provided with means for separating gravel or other coarse materials from the sand and discharging these relatively coarse portions at one side of the receptacle.

Signed by me at Chicago, Ill., this 7th day of Oct., 1915.

RAYMOND W. DULL.